US012600103B2

(12) United States Patent
Zhu

(10) Patent No.: US 12,600,103 B2
(45) Date of Patent: Apr. 14, 2026

(54) CAN PRESS

(71) Applicant: Dongguan Zhennan Technology Co., Ltd., Dongguan (CN)

(72) Inventor: Weixing Zhu, Dongguan (CN)

(73) Assignee: Dongguan Zhennan Technology Co., Ltd., Dongguan (CN)

( * ) Notice: Subject to any disclaimer, the term of this patent is extended or adjusted under 35 U.S.C. 154(b) by 281 days.

(21) Appl. No.: 18/613,072

(22) Filed: Mar. 21, 2024

(65) Prior Publication Data

US 2025/0276504 A1 Sep. 4, 2025

(30) Foreign Application Priority Data

Mar. 1, 2024 (CN) ......................... 202410241707.5

(51) Int. Cl.
*B30B 1/04* (2006.01)
*B30B 9/32* (2006.01)
*B30B 15/32* (2006.01)

(52) U.S. Cl.
CPC ................ *B30B 1/04* (2013.01); *B30B 9/321* (2013.01); *B30B 15/32* (2013.01)

(58) Field of Classification Search
CPC ........... B30B 1/04; B30B 9/321; B30B 9/323; B30B 9/3014; B30B 9/3053; B30B 15/32; B65B 63/02; B65B 35/20; B65B 35/58; B09B 3/35; B09B 3/32; B09B 2101/10; Y10S 100/902
See application file for complete search history.

(56) References Cited

U.S. PATENT DOCUMENTS 4,290,354 A * 9/1981 Stevens ................... B30B 9/321 100/283
4,890,552 A * 1/1990 Yelczyn .................. B30B 9/321 100/283
5,848,569 A * 12/1998 Maki ....................... B30B 9/321 D15/123
2006/0021525 A1* 2/2006 Geise ...................... B30B 9/321 100/214
2021/0323258 A1* 10/2021 Winterer .................. B30B 1/04

* cited by examiner

*Primary Examiner* — Jimmy T Nguyen

(57) ABSTRACT

A can press includes a supporting part, a power part and a turnover part. The supporting part includes a placing plate and a supporting piece, and the placing plate is movably connected with the supporting piece; the power part includes an extruding piece and a driving piece, the extruding piece is slidably connected to the supporting piece, the driving piece is used for driving the extruding piece to slide, the extruding piece is used for extruding a pop can, after the extrusion, the extruding piece slides to drive the turnover part to move, and the turnover part drives the placing plate to turn over, so that the pop can falls off from the placing plate. The mode is convenient for a user to apply force, saves physical strength, and reduces fatigue of arms of the user.

11 Claims, 12 Drawing Sheets

CAN PRESS

CROSS REFERENCE TO RELATED APPLICATIONS

The present application claims the benefit of Chinese Patent Application No. 202410241707.5 filed on Mar. 1, 2024, the contents of which are incorporated herein by reference in their entirety.

TECHNICAL FIELD

The present invention relates to the technical field of articles of daily use, and more particularly, to a can press.

BACKGROUND

Pop cans and plastic bottles are the most commonly used food containers in daily life. After people use the pop cans and the bottles, as bodies of the pop cans and the bottles are both cylindrical, they are not easy to place and roll, which are extremely inconvenient to store. Therefore, there is a machine for extruding pop cans into a flat shape in the market, that is, a can press. The can press in the prior art usually uses an extruding piece to extrude a pop can, and a user manually pulls the extruding piece to a certain height, and then slides the extruding piece in a direction close to the pop can to extrude the pop can, and a pressed product cannot be automatically collected and need to be taken manually. When using this method, it is necessary to manually pull up the extruding piece, and arms of the user move linearly in a height direction, which is very laborious. Moreover, the arms are easy to be tired and sore, and the pop can needs to be taken manually, and cannot be automatically placed in a garbage bin or a collection bag. Moreover, the user needs to apply a force vertically downward, which is very inconvenient to operate, and there is one more action to take the product, resulting in low efficiency.

SUMMARY

In order to solve at least one problem in the prior art, the present invention provides a can press.

A can press comprises a supporting part, a power part and a turnover part, wherein the supporting part comprises a placing plate and a supporting piece, the placing plate is movably connected with the supporting piece, and the placing plate is used for placing the pop can; the power part comprises an extruding piece and a driving piece, the extruding piece is slidably connected to the supporting piece, and the driving piece is respectively connected with the extruding piece and the supporting piece; the driving piece is used for driving the extruding piece to slide in a direction close to or away from the placing plate, and the extruding piece is used for extruding the pop can; and the turnover part is respectively connected with the extruding piece and the placing plate; wherein, after the extruding piece performs extrusion, the extruding piece slides in the direction away from the placing plate, the extruding piece drives the turnover part to move, and the turnover part drives the placing plate to turn over, so that the pop can falls off from the placing plate.

In some embodiments, the driving piece comprises a rotating piece and a first connecting piece, the rotating piece is rotatably connected to the supporting piece, and the first connecting piece is respectively connected with the rotating piece and the extruding piece; wherein, the rotating piece rotates to drive the first connecting piece to move, and the first connecting piece moves to drive the extruding piece to slide, so that the extruding piece is close to or away from the placing plate.

In some embodiments, the supporting part further comprises a first elastic piece, one end of the placing plate away from the supporting piece is movably connected with the supporting piece, one end of the placing plate close to the supporting piece is overlapped with the supporting piece, and the first elastic piece is connected between the placing plate and the supporting piece, wherein when the extruding piece slides in the direction away from the placing plate, the extruding piece drives the turnover part to move, the turnover part drives the placing plate to rotate in a direction away from the supporting piece, and the first elastic piece drives the placing plate to rotate in a direction close to the supporting piece.

In some embodiments, the turnover part comprises a sliding piece, the sliding piece is rotatably connected with the placing plate, the sliding piece is slidably connected to the supporting piece, and the sliding piece and the extruding piece are arranged on two opposite sides of the supporting piece in a lengthwise direction at interval, the supporting piece is provided with a through groove, and at least part of the sliding piece is in sliding fit with the through groove and passes through the through groove for abutting against the extruding piece;

wherein, when the extruding piece slides in the direction close to the placing plate, the extruding piece presses the sliding piece to move the sliding piece in a direction away from the extruding piece; and when the extruding piece slides in the direction away from the placing plate, the clamping piece abuts against the sliding piece and drives the sliding piece to slide in the direction away from the extruding piece, and the sliding piece slides to drive the placing plate to rotate.

In some embodiments, the turnover part comprises a clamping piece and a clamping portion, the clamping piece is connected with the extruding piece and is slidably connected with the supporting piece, the clamping portion is connected to the placing plate and is slidably connected with the supporting piece, and the clamping piece is used for clamping with the clamping portion;

wherein, when the extruding piece slides in the direction close to the placing plate, the extruding piece drives the clamping piece to slide in the direction close to the placing plate, so that the clamping piece is clamped with the clamping portion; and when the extruding piece slides in the direction away from the placing plate, the clamping piece drives the clamping portion to move, and drives the placing plate to rotate relative to the supporting piece.

In some embodiments, the clamping piece comprises a body portion and two clamping arms symmetrically connected to the body portion, the body portion is connected with the extruding piece, and the two clamping arms protrude in a direction close to each other to form a convex portion, the convex portion is provided with a first inclined plane, an arc surface and a second inclined plane, the first inclined plane, the arc surface and the second inclined plane are connected smoothly in turn, and the convex portion is used for clamping with the clamping portion.

In some embodiments, the sliding piece bulges in a direction close to the through groove to form an abutting portion, and the abutting portion is in sliding fit with the through groove and passes through the through groove for abutting against the extruding piece; and along a height direction of the supporting piece, the abutting portion gradually inclines from top to bottom in a direction close to the extruding piece.

In some embodiments, the supporting part comprises a guide plate, one end of the guide plate is connected with the supporting piece, and along a height direction of the supporting piece, the guide plate gradually inclines from bottom to top in a direction close to the sliding piece; wherein, when the extruding piece drives the sliding piece to move in the direction away from the placing plate, the guide plate abuts against the sliding piece to move the sliding piece in the direction away from the extruding piece.

In some embodiments, the turnover part comprises a second elastic piece, the second elastic piece is connected with the supporting piece, the sliding piece is arranged between the supporting piece and the second elastic piece, and the second elastic piece is used for elastically abutting against the sliding piece to move the sliding piece in a direction close to the through groove.

In some embodiments, the turnover part further comprises a second connecting piece, the second connecting piece is rotatably connected with the placing plate and the sliding piece respectively, the second connecting piece is formed with a limiting groove, and at least part of the placing plate is located in the limiting groove and is in limiting fit with the second connecting piece; wherein, when the sliding piece slides in the direction away from the placing plate, the sliding piece drives the second connecting piece to move, and the second connecting piece drives the placing plate to rotate through the limiting groove.

Compare with the prior art, the can press according to the embodiments of the present invention has the beneficial effects that: the present application comprises the supporting part, the power part and the turnover part. The supporting part comprises the placing plate and the supporting piece, and the placing plate is movably connected with the supporting piece; the power part comprises the extruding piece and the driving piece, the extruding piece is slidably connected to the supporting piece, the driving piece is respectively connected with the extruding piece and the supporting piece, the driving piece is used for driving the extruding piece to slide in the direction close to or away from the placing plate, the extruding piece is used for extruding the pop can, and the turnover part is respectively connected with the extruding piece and the placing plate. When the extruding piece performs extrusion, the extruding piece slides in the direction away from the placing plate, the extruding piece drives the turnover part to move, and the turnover part drives the placing plate to turn over, so that the pop can falls off from the placing plate. Compared with the prior art, the present application drives the extruding piece to slide by rotating the driving piece, so that the pop can is extruded by the extruding piece, and a user can realize an extruding function of the extruding piece only by rotating the driving piece, which is convenient for the user to apply a force, saves physical strength and reduces fatigue of arms of the user; and after the extrusion, the turnover part is driven to move at the same time during a resetting process of the extruding piece, so that the turnover part drives the placing plate to turn over, and the placing plate directly pushes the extruded finished product into a garbage bag or a garbage bin on the ground, thereby realizing a function of automatic collection and reducing a time for taking the extruded finished product and placing a new product to be extruded, and being more convenient to operate.

Figure 1:
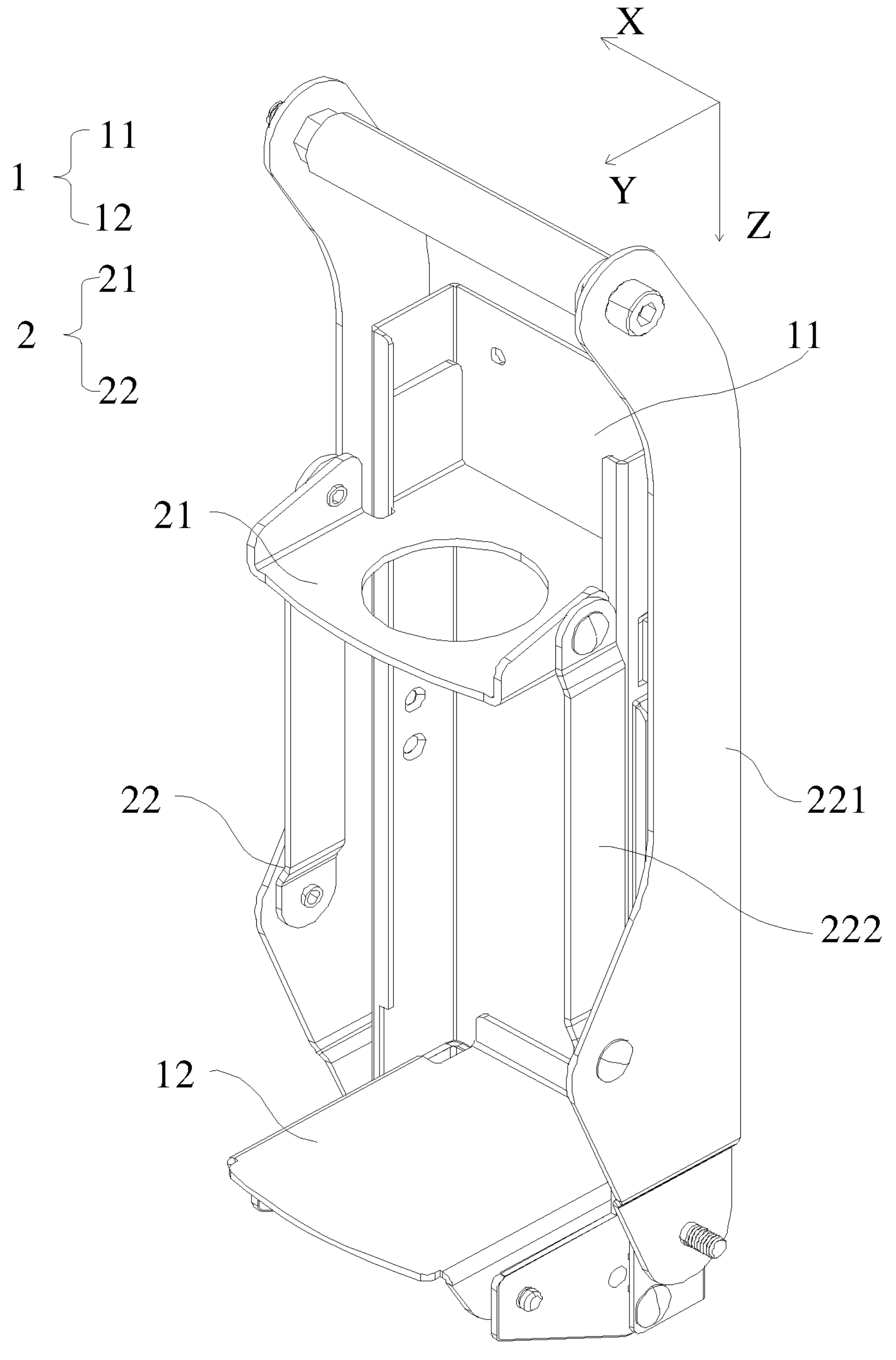
FIG. 1 is a schematic structural diagram of a can press in the embodiments of the present application.

Reference numerals: 1 refers to supporting part; 2 refers to power part; 3 refers to turnover part; X refers to lengthwise direction; Y refers to width direction; Z refers to height direction; 11 refers to supporting piece; 12 refers to placing plate; 13 refers to guide plate; 14 refers to first elastic piece; 111 refers to through groove; 112 refers to insertion groove; 114 refers to vertical plate; 115 refers to horizontal plate; 121 refers to inserting portion; 122 refers to free end; 123 refers to connecting end; 21 refers to extruding piece; 22 refers to driving piece; 221 refers to rotating piece; 222 refers to first connecting piece; 31 refers to sliding piece; 32 refers to second elastic piece; 33 refers to second connecting piece; 34 refers to clamping piece; 35 refers to clamping portion; 311 refers to abutting portion; 331 refers to limiting groove; 341 refers to body portion; 342 refers to clamping arm; 343 refers to convex portion; 344 refers to first inclined plane; 345 refers to arc surface; and 346 refers to second inclined plane.

DETAILED DESCRIPTION

In order to make those skilled in the art better understand the technical solution of the present invention, the present invention is described in detail hereinafter with reference to the drawings, and the descriptions in this part are only exemplary and explanatory, and should not limit the scope of protection of the present invention.

It should be noted that: similar reference numerals and letters indicate similar items in the following drawings, so once one item is defined in one drawing, it does not need to be further defined and explained in the following drawings.

It should be noted that if the orientation or position relationship indicated by the terms “center”, “upper”, “lower”, “left”, “right”, “vertical”, “horizontal”, “inner”, “outer”, and the like is based on the orientation or position relationship shown in the accompanying drawings, or the orientation or position relationship of the product of the present invention in use, it is only for the convenience of description of the present invention and simplification of the description, and it is not to indicate or imply that the indicated device or element must have a specific orientation, and be constructed and operated in a specific orientation. Therefore, the terms should not be understood as limiting the present invention. In addition, the terms “first”, “second”, "third", and the like are used for distinguishing description only and cannot be understood as indicating or implying relative importance.

In addition, the terms "horizontal", "vertical", "overhanging", and the like do not mean that the components are required to be absolutely horizontal or overhanging, but may be slightly inclined. For example, "horizontal" only means that the direction is more horizontal relative to "vertical", and does not mean that the structure must be completely horizontal, but may be slightly inclined.

Unless otherwise defined, all technical and scientific terms used herein have the same meanings as those commonly understood by those skilled in the technical field of the present invention. The terms used in the specification of the present invention herein are only for the purpose of describing specific embodiments, and are not intended to limit the present invention.

The present invention will be further described hereinafter in detail with reference to the drawings.

Referring to FIG. 1, for the sake of clear description, X indicates a lengthwise direction X of a supporting piece 11, Y indicates a width direction Y of the supporting piece 11, and Z indicates a height direction Z of the supporting piece 11.

Figure 2:
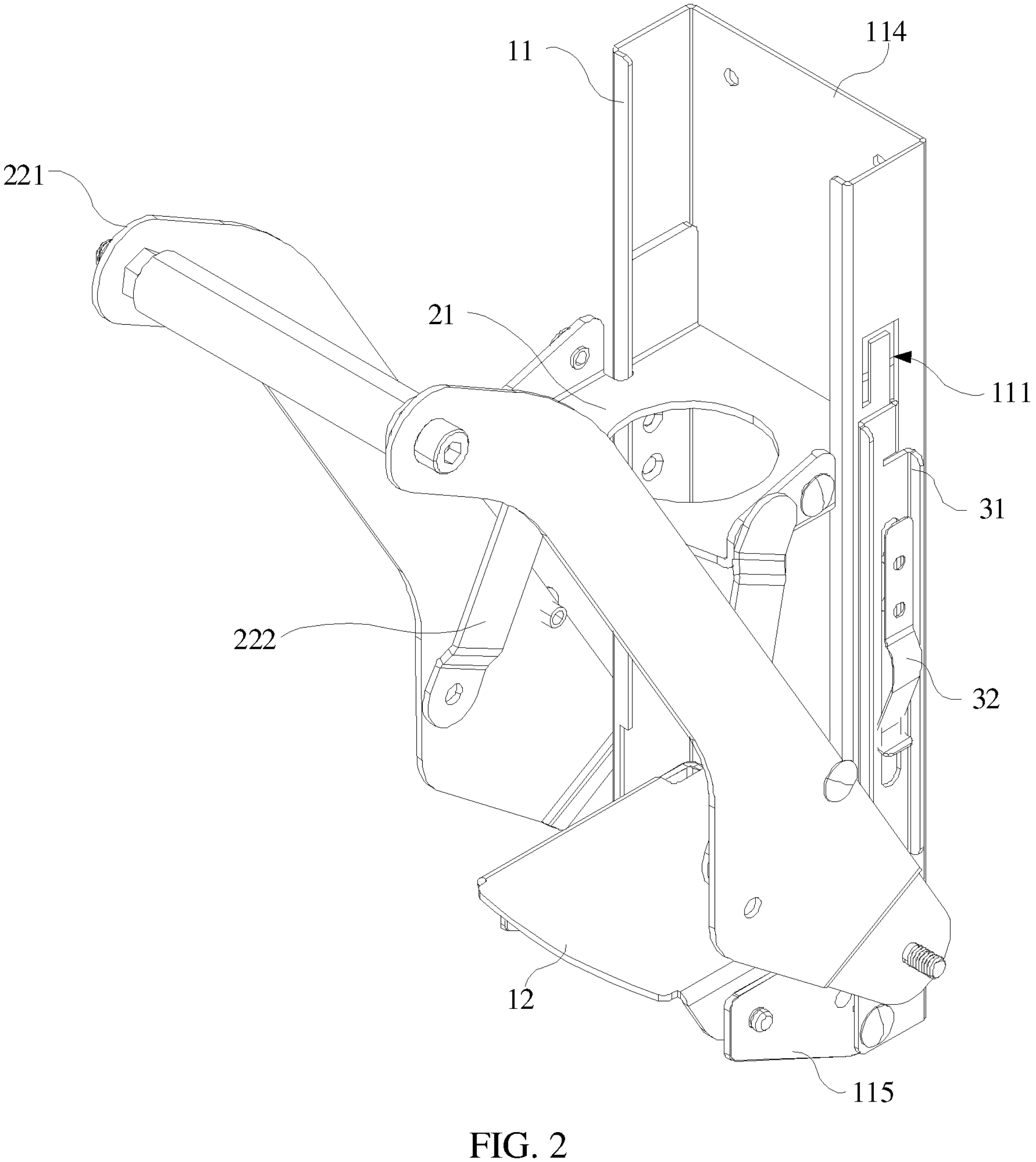
FIG. 2 is a schematic diagram showing a working state of the can press in the embodiments of the present application.

Referring to FIG. 1 and FIG. 2, a can press comprises a supporting part 1, a power part 2 and a turnover part 3. The supporting part 1 comprises a placing plate 12 and a supporting piece 11. The placing plate 12 is movably connected with the supporting piece 11 and is used for placing the pop can. The power part 2 comprises an extruding piece 21 and a driving piece 22, the extruding piece 21 is slidably connected to the supporting piece 11, and the driving piece 22 is respectively connected with the extruding piece 21 and the supporting piece 11, wherein the driving piece 22 is used for driving the extruding piece 21 to slide in a direction close to or away from the placing plate 12, and the extruding piece 21 is used for extruding the pop can. The turnover part 3 is respectively connected with the extruding piece 21 and the placing plate 12; wherein, after the extruding piece 21 performs extrusion, the extruding piece 21 slides in the direction away from the placing plate 12, the extruding piece 21 drives the turnover part 3 to move, and the turnover part 3 drives the placing plate 12 to turn over, so that the pop can falls off from the placing plate 12.

During actual application, the supporting piece 11 is provided with a plurality of fixing holes, and the supporting piece 11 can be fixed to a wall through the fixing holes. The placing plate 12 is placed on the supporting piece 11 and movably connected with the supporting piece 11. The movable connection particularly refers to that the placing plate 12 can move or rotate relative to the supporting piece 11, and the placing plate 12 is used for placing the pop can or a plastic bottle. As a main structural part, the supporting piece 11 is used to be fixed to the wall to complete installation of the can press on one hand, and meanwhile, a use space of the can press is saved by installing the supporting piece on the wall. On the other hand, the supporting piece 11 is used for supporting the placing plate 12 to improve a stress capacity of the placing plate 12.

In one embodiment, the supporting piece 11 may comprise a horizontal plate 115 and a vertical plate 114 which are vertically connected together. The horizontal plate 115 is movably connected with the placing plate 12 and used for supporting the placing plate 12 to improve the stress capacity of the placing plate 12. The extruding piece 21 is slidably connected with the vertical plate 114, the vertical plate 114 is connected with the wall, and the vertical plate 114 may be designed to be parallel to the wall, which can reduce an overall thickness of the can press and save a production cost.

The above-mentioned extruding piece 21 can slide along the height direction Z of the supporting piece 11, and the driving piece 22 is respectively connected with the extruding piece 21 and the supporting piece 11. Specifically, the driving piece 22 may be rotatably connected with the extruding piece 21 and the supporting piece 11, and the driving piece 22 can rotate in a direction away from the supporting piece 11, which can drive the extruding piece 21 to slide in a direction close to the placing plate 12, so that the extruding piece 21 can be extruded into a flat shape for convenient storage. The driving piece 22 rotates in a direction close to the supporting piece 11, which can drive the extruding piece 21 to slide in a direction away from the placing plate 12, so that the extruding piece 21 is away from the placing plate 12, which is convenient for placing next pop can. At the same time, when the extruding piece 21 slides away from the placing plate 12, the extruding piece 21 drives the turnover part 3 to move. Because the turnover part 3 is connected with the placing plate 12, the turnover part 3 drives the placing plate 12 to turn over around the horizontal plate 115, so that a extruded finished product (pop can) can freely fall off from the placing plate 12, and a function of automatic collection is realized. Compared with the prior art, the present application drives the extruding piece 21 to slide by rotating the driving piece 22, so that the pop can is extruded by the extruding piece 22, and a user can realize an extruding function of the extruding piece 21 only by rotating the driving piece 22, which is convenient for the user to apply a force, saves physical strength and reduces fatigue of arms of the user; and after the extrusion, the turnover part 3 is driven to move at the same time during a lifting process of the extruding piece 21, so that the turnover part 3 drives the placing plate 12 to turn over, and the placing plate 12 directly pushes the extruded finished product into a garbage bag or a garbage bin on the ground, thereby realizing a function of automatic collection and reducing a time for taking the extruded finished product and placing a non-extruded product, and being more convenient to operate.

Figure 3:
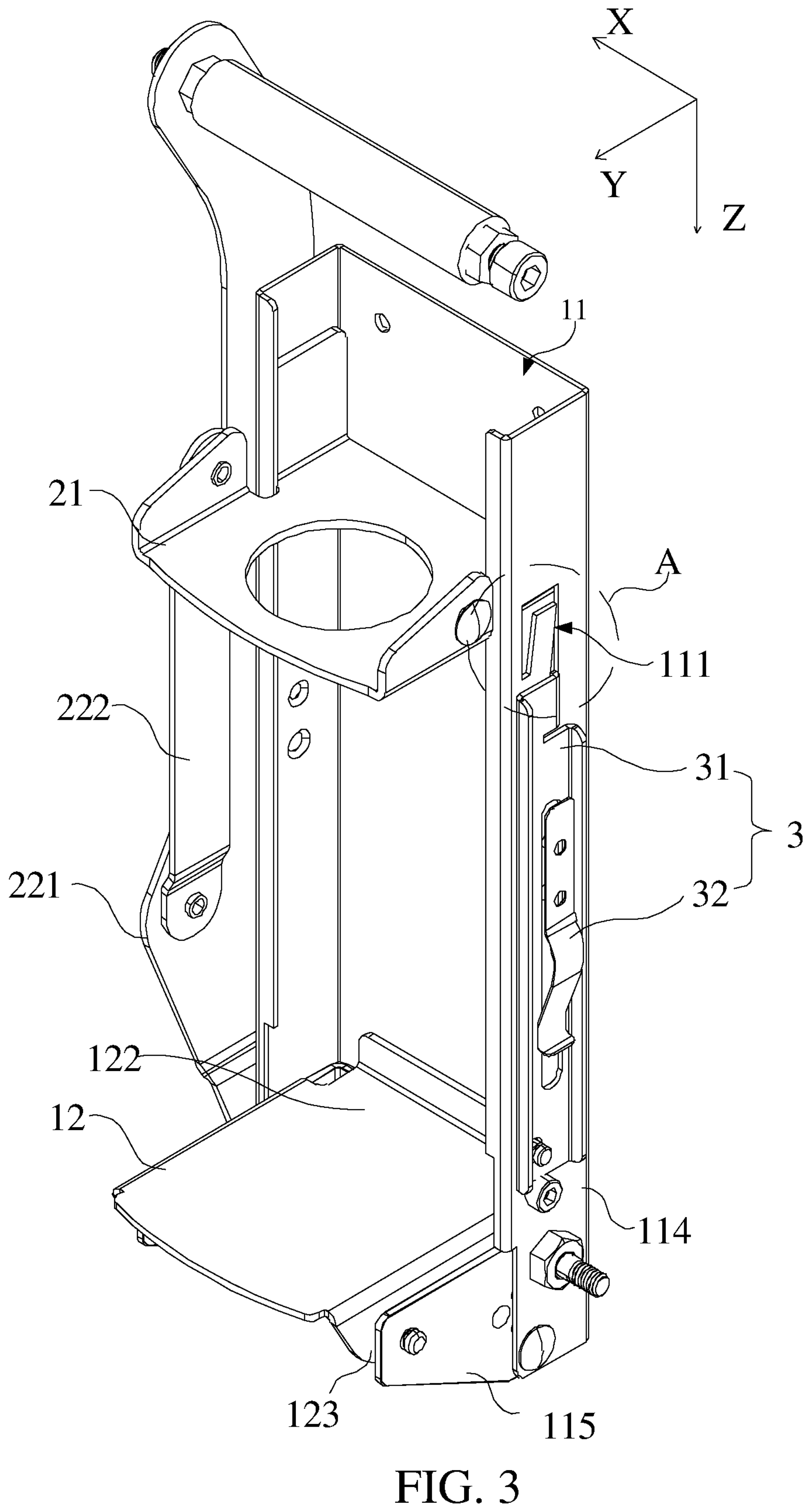
FIG. 3 is a schematic structural diagram of a turnover part in the embodiments of the present application.

Referring to FIG. 2 and FIG. 3, the driving piece 22 comprises a rotating piece 221 and a first connecting piece 222. The rotating piece 221 is rotatably connected to the supporting piece 11, and the first connecting piece 222 is rotatably connected to the rotating piece 221 and the extruding piece 21 respectively; wherein, the rotating piece 221 rotates to drive the first connecting piece 222 to move, and the first connecting piece 222 moves to drive the extruding piece 21 to slide, so that the extruding piece 21 is close to or away from the placing plate 12.

During actual application, a bottom of the rotating piece 221 may be rotatably connected to the supporting piece 11, a middle of the rotating piece 221 may be rotatably connected with a bottom of the first connecting piece 222, and a top of the first connecting piece 222 is rotatably connected with the extruding piece 21. When the rotating piece 221 rotates in the direction away from the supporting piece 11, the rotating piece 221 drives the bottom of the first connecting piece 222 to move in the direction away from the supporting piece 11, so that the bottom of the first connecting piece 222 generates a downward pulling force on a top thereof. As the top of the first connecting piece 222 is rotatably connected with the extruding piece 21, the first connecting piece 222 generates a downward pulling force on the extruding piece 21, which makes the extruding piece 21 move downwards, that is, move in the direction close to the placing plate 12 to realize an extruding effect of the extruding piece 21.

When the rotating piece 221 rotates in the direction close to the supporting piece 11, the rotating piece 221 drives the bottom of the first connecting piece 222 to move in the direction close to the supporting piece 11. In this case, the bottom of the first connecting piece 222 generates an upward pushing force on the top thereof. Therefore, the first connecting piece 222 generates an upward pushing force on the extruding piece 21, which makes the extruding piece 21 move upwards, that is, move in the direction away from the placing plate 12 to place next pop can on the placing plate 12. In the present application, the rotating piece 221 drives the extruding piece 21 to slide through the first connecting piece 222, which increases a rotating range of the rotating piece 221. The rotating piece 221 can rotate around the supporting piece 11 by 180 degrees, which increases a movable range of the extruding piece 21. On one hand, a maximum distance between the extruding piece 21 and the placing plate 12 is increased, so that different types of pop cans can be placed. On the other hand, the rotating range of the rotating piece 221 is close to 180 degrees, which increases an extruding force of the extruding piece 21 to extrude the pop can, thus extruding the pop can more tightly and saving a storage space.

Figure 4:
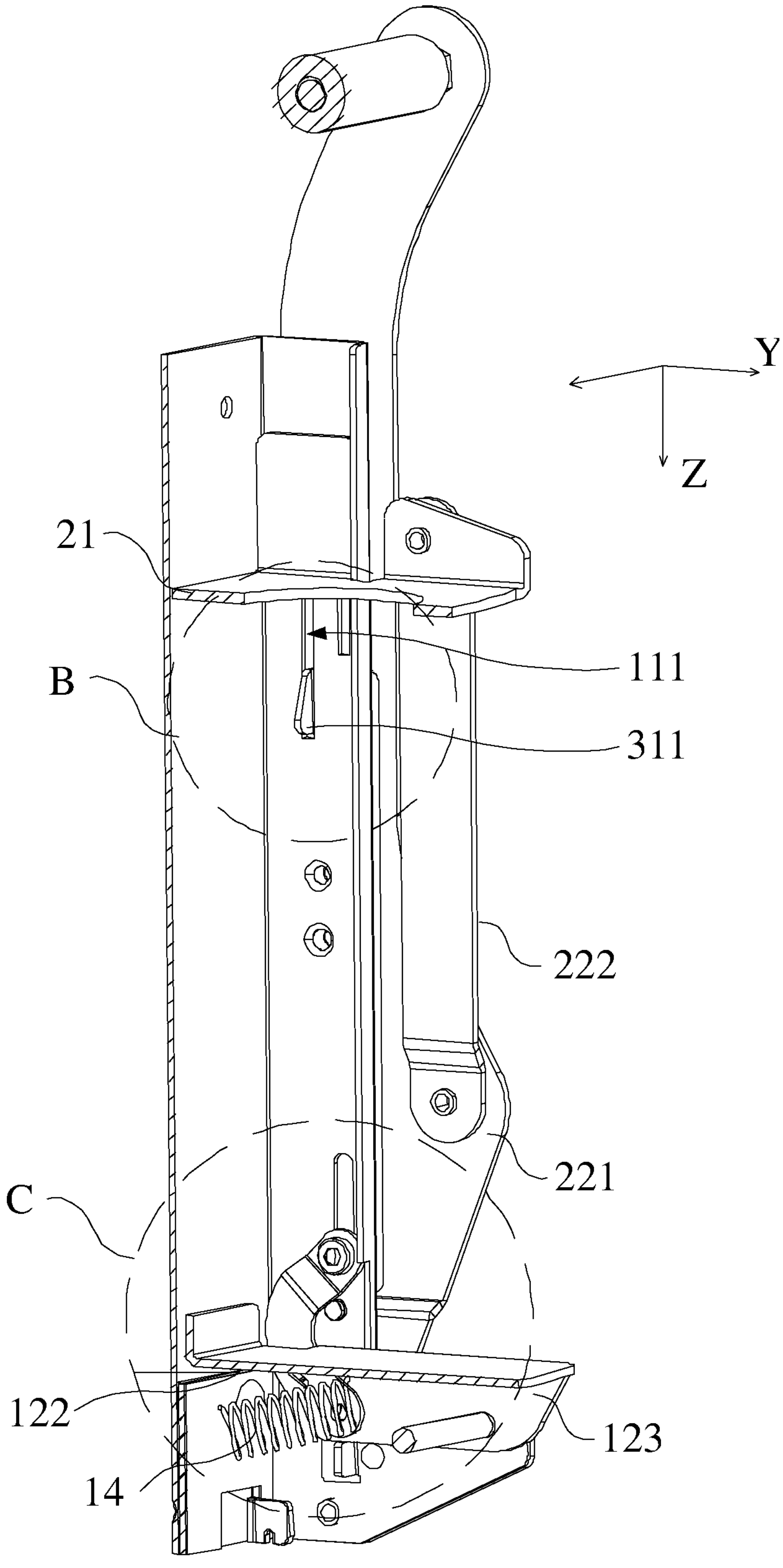
FIG. 4 is a cross-section schematic diagram of the can press in the embodiments of the present application.

Referring to FIG. 3 and FIG. 4, the supporting part 1 further comprises a first elastic piece 14, and one end of the placing plate 12 away from the supporting piece 11 is movably connected with the supporting piece 11. One end of the placing plate 12 close to the supporting piece 11 is overlapped with the supporting piece 11, and the first elastic piece 14 is connected between the placing plate 12 and the supporting piece, wherein, when the extruding piece slides in the direction away from the placing plate, the extruding piece drives the turnover part to move, the turnover part 3 drives the placing plate 12 to rotate in the direction away from the supporting piece 11, and the first elastic piece 14 drives the placing plate 12 to rotate in the direction close to the supporting piece 11.

Specifically, one end of the placing plate 12 close to the vertical plate 114 is a free end 122, and the free end 122 is overlapped with the horizontal plate 115. One end of the placing plate 12 away from the vertical plate 114 is a connecting end 123, and the connecting end 123 is rotatably connected with the horizontal plate 115. In this manner, the free end 122 of the placing plate 12 can rotate around the horizontal plate 115. The turnover part 3 is connected with the placing plate 12 and the extruding piece 21 respectively. When the extrusion is completed, the rotating piece 221 drives the extruding piece 21 to slide in the direction away from the placing plate 12, and the extruding piece 21 drives the turnover part 3 to move, so that the turnover part 3 drives the placing plate 12 to turn over around the horizontal plate 115, so that the pop can falls off from the placing plate 12, and a function of automatic collection is realized. Since the first elastic piece 14 is arranged between the placing plate 12 and the supporting piece 11, when the pop can falls off, the placing plate 12 is driven to rotate in the direction close to the supporting piece 11 by elastic resilience of the first elastic piece 14 until the free end 122 is overlapped on the horizontal plate 115 again, thus realizing a function of automatic reset. A spring may be employed as the first elastic piece 14.

In one embodiment, referring to FIG. 2 and FIG. 3, the turnover part 3 may comprise a sliding piece 31. The sliding piece is rotatably connected with the placing plate 12, and the sliding piece 31 is slidably connected to the supporting piece 11. Moreover, the sliding piece 31 and the extruding piece 21 are arranged on two opposite sides of the supporting piece 11 n a lengthwise direction X at interval, and the supporting piece 11 is provided with a through groove 111. At least part of the sliding piece 31 is in sliding fit with the through groove 111 and passes through the through groove 111 for abutting against the extruding piece 21. It can be understood that the through groove 111 extends along the height direction Z of the supporting piece 11, and the sliding piece 31 may slide in the through groove 111.

When the extruding piece 21 slides in the direction close to the placing plate 12, the extruding piece 21 presses the sliding piece 31 to move the sliding piece 31 in a direction away from the extruding piece 21. Specifically, the sliding piece 31 is provided with a top and a bottom, the bottom is slidably connected with the supporting piece 11 and is rotatably connected with the free end 122 of the placing plate 12. At least part of the top passes through the through groove 111, and the top may be made of plastic or soft rubber. In an initial state, the top is clamped with a groove bottom of the through groove 111, that is, the sliding piece 31 can only slide upwards in the height direction Z in the through groove 111. When the extruding piece 21 slides in the direction close to the placing plate 12, the extruding piece 21 extrudes the top of the sliding piece 31 downwards. Because the top is the free end 122 and has certain elasticity, the top of the sliding piece 31 can move in the direction away from the extruding piece 21 along the length direction X of the supporting piece 11 to avoid the extruding piece 21 and avoid obstructing the extruding piece 21 from moving downwards. Until the extruding piece 21 moves downwards to separate from the sliding piece 31, the top of the sliding piece 31 can be reset under the action of the elasticity thereof and extend into the through groove 111 again.

It can be understood that the top of the sliding piece 31 may be made of elastic materials such as plastic or soft rubber, or the elastic piece can be arranged between the sliding piece 31 and the supporting piece 11, and the sliding piece 31 can be driven to reset by a restoring force of the elastic piece, so that the sliding piece can extend into the through groove 111 again.

After the extruding piece 21 extrudes the pop can, the rotating piece 221 drives the extruding piece 21 to slide upwards, that is, the extruding piece 21 slides in the direction away from the placing plate 12, the extruding piece 21 abuts against the sliding piece 31 and drives the sliding piece 31 to slide in the direction away from the placing plate 12, and the sliding piece 31 slides to drive the placing plate 12 to rotate.

Because the top of the sliding piece 31 is clamped with the groove bottom of the through groove 111, the sliding piece 31 cannot slide downwards, but can slide upwards in the height direction Z in the through groove 111. Therefore, when the extruding piece 21 slides upwards and abuts against the top of the sliding piece 31, the extruding piece 21 can continue to slide upwards to drive the sliding piece 31 to slide together. In this manner, the bottom of the sliding piece 31 drives the free end 122 of the placing plate 12 to move upwards, so that the placing plate 12 can be turned over around the horizontal plate 115, so that the pop can is capable of falling off from the placing plate 12. By arranging the turnover part 3, when the extruding piece 21 moves away from the placing plate 12 to prepare for next extruding work after the extruding piece 21 extrudes the pop can, the extruding piece 21 drives the turnover part 3 to turn the placing plate 12, so that the turnover part 3 drives the placing plate 12 to turn over, and the pop can automatically falls off without manual taking, thus saving time and labor.

Figure 5:
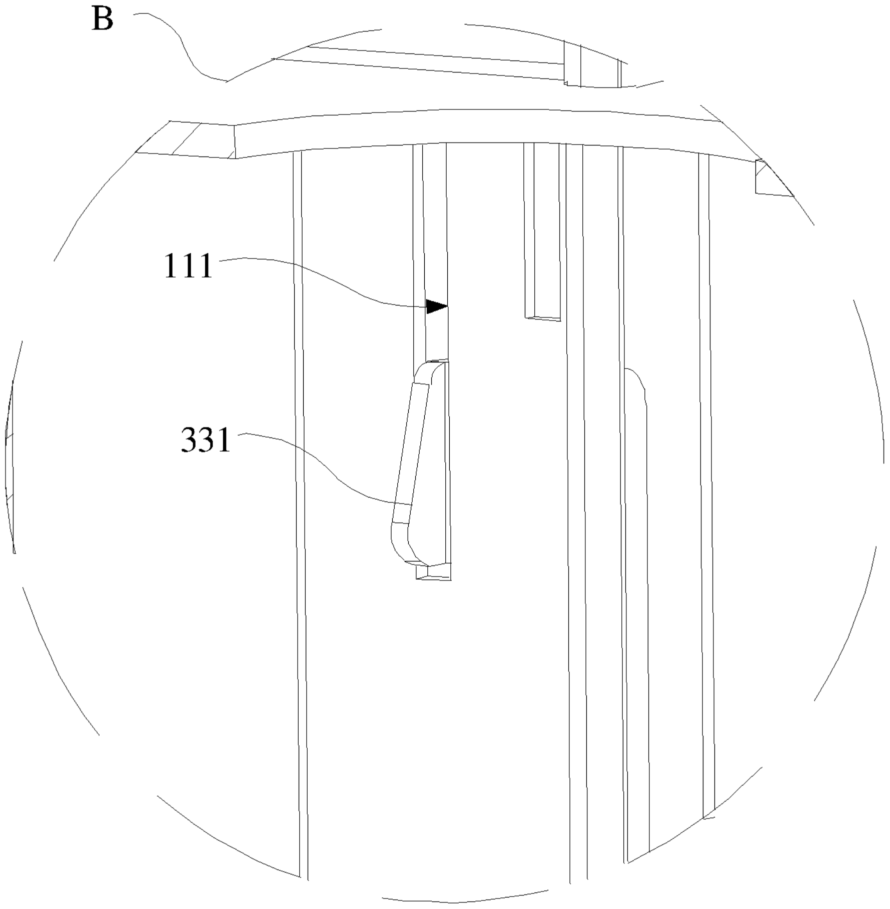
FIG. 5 is an enlarged drawing of a structure at a portion B in FIG. 4.

Referring to FIG. 4 and FIG. 5, the sliding piece 31 bulges in a direction close to the through groove 111 to form an abutting portion 311, and the abutting portion 311 is in sliding fit with the through groove 111 and passes through the through groove 111 for abutting against the extruding piece 21. Along the height direction Z of the supporting piece 11, the abutting portion 311 gradually inclines from top to bottom in a direction close to the extruding piece 21.

One side of the abutting portion 311 close to the extruding piece 21 is an inclined plane, and the inclined plane gradually inclines to the direction of the extruding piece 21 from top to bottom, so that when the extruding piece 21 moves downwards, the extruding piece 21 abuts against the inclined plane. Under the guidance of the inclined plane, the extruding piece 21 slides along the inclined plane and exerts an outward abutting force on the inclined plane. Under the action of the abutting force, the abutting portion 311 moves outwards, that is, moves in the direction away from the extruding piece 21, which can effectively prevent the abutting portion 311 from blocking the movement of the extruding piece 21, so that the extruding piece 21 slides downwards more smoothly. Meanwhile, as a length of the through groove 111 protruding from a lower side of the abutting portion 311 is longer, when the extruding piece 21 moves upwards, the extruding piece 21 and the abutting portion 311 are more easily abutted together, which effectively prevents the extruding piece 21 from being separated from the abutting portion 311 during the upward movement, so that the extruding piece 21 can drive the abutting portion 311 to slide upwards in the height direction Z, and then drive the placing plate 12 to turn over, thus completing the function of automatic collection.

Figure 6:
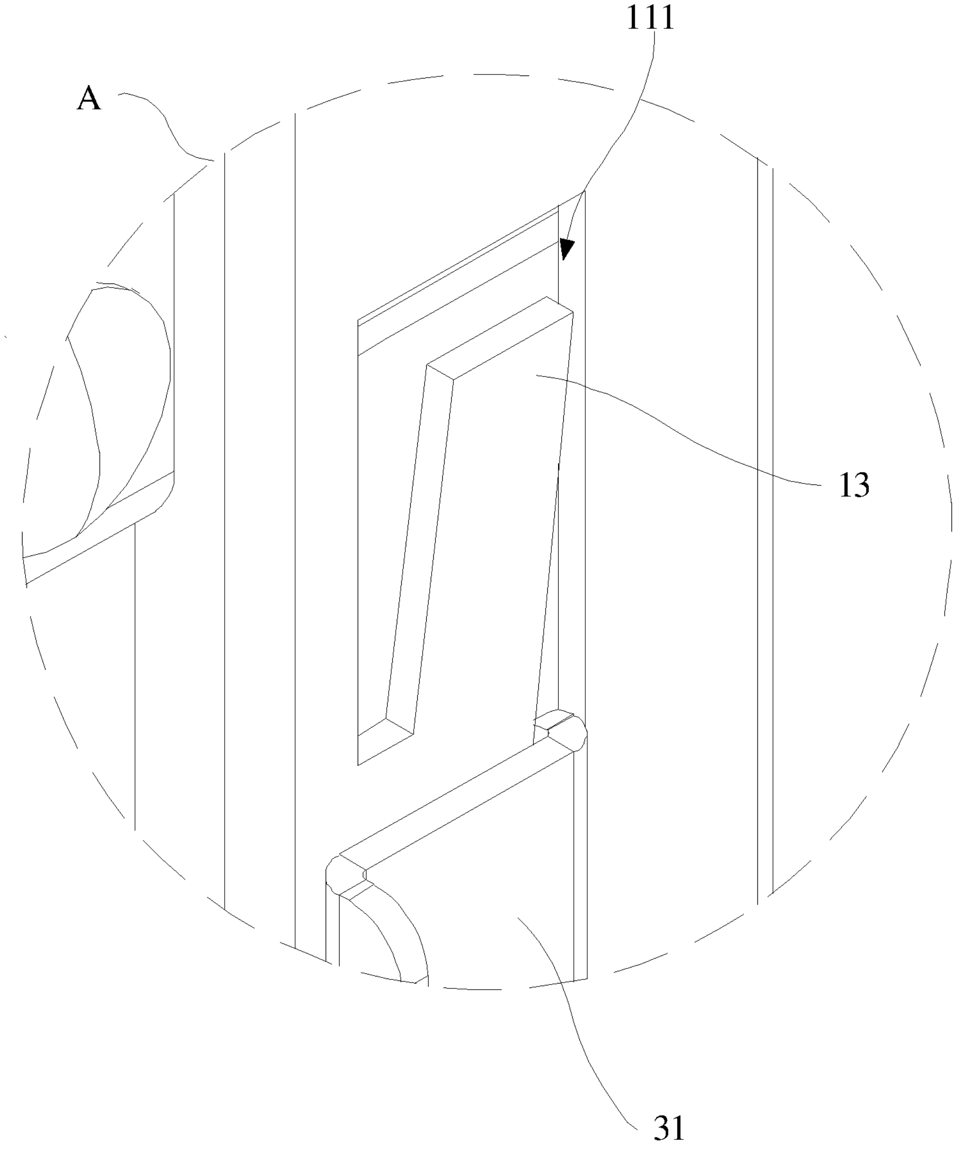
FIG. 6 is an enlarged drawing of a structure at a portion A in FIG. 3.

Referring to FIG. 6, the supporting part 1 further comprises a guide plate 13. One end of the guide plate 13 is connected with the supporting piece 11, and along the height direction Z of the supporting piece 11, the guide plate 13 gradually inclines from bottom to top in the direction close to the sliding piece 31. When the extruding piece 21 drives the sliding piece 31 to move in the direction away from the placing plate 12, the guide plate 13 abuts against the sliding piece 31 to move the sliding piece 31 in the direction away from the extruding piece 21.

In practical application, the supporting piece 11 may be provided with a U-shaped through groove 111, and the U-shaped through groove 111 is arranged around the guide plate 13. The abutting portion 311 of the sliding piece 31 may be in sliding fit with the through groove 111 on one side of the guide plate 13. When the extruding piece 21 slides upwards and abuts against the abutting portion 311, the extruding piece 21 drives the sliding piece 31 to slide upwards. Since the guide plate 13 gradually inclines to an outside of the supporting piece 11 from bottom to top, the sliding piece 31 abuts against the guide plate 13 in an upward sliding process, so that the sliding piece 31 moves in the direction away from the extruding piece 21, so that the extruding piece 21 can be smoothly separated from the abutting portion 311. In this way, under the guiding function of the guide plate 13, when the sliding piece 31 slides upwards to drive the placing plate 12 to turn over, the extruding piece 21 and the abutting portion 311 are separated smoothly, and the first elastic piece 14 pulls the placing plate 12 to reset, further pulling the sliding piece 31 to slide downwards to the initial position. Meanwhile, the abutting portion 311 may extend into the through groove 111 again under an elastic action of the sliding piece 31 or a restoring force of the elastic piece, thus completing the function of automatic reset.

It can be understood that the sliding piece 31 may be provided with two abutting portions 311, which are respectively in sliding fit with the through grooves 111 on both sides of the guide plate 13, and the guide plate 13 is located between the two abutting portions 311. Such arrangement can also play the above-mentioned guiding function.

Referring to FIG. 3 again, the turnover part 3 further comprises a second elastic piece 32. The second elastic piece 32 is connected with the supporting piece 11, and the sliding piece 31 is arranged between the supporting piece 11 and the second elastic piece 32. The second elastic piece 32 is used for elastically abutting against the sliding piece 31, so that the sliding piece 31 moves in the direction close to the through groove 111.

In order to make the sliding piece 31 be reset smoothly, a second elastic piece 32 is provided in the present application. The second elastic piece 32 abuts the sliding piece 31 on a side of the supporting piece 11. When the sliding piece 31 moves to the outside of the supporting piece 11 under the action of the guide plate 13 or the extruding piece 21, the sliding piece 31 is pushed to move in the direction close to the through groove 111 by elastic resilience of the second elastic piece 32, so that the sliding piece 31 can be reset. The abutting portion 311 may extend into the through groove 111 again to abut against and cooperate with the extruding piece 21, so as to prevent the sliding piece 31 from being elastically restored after deformation, and improve a service life of the can press. A spring leaf may be employed as the second elastic piece 32.

Figure 7:
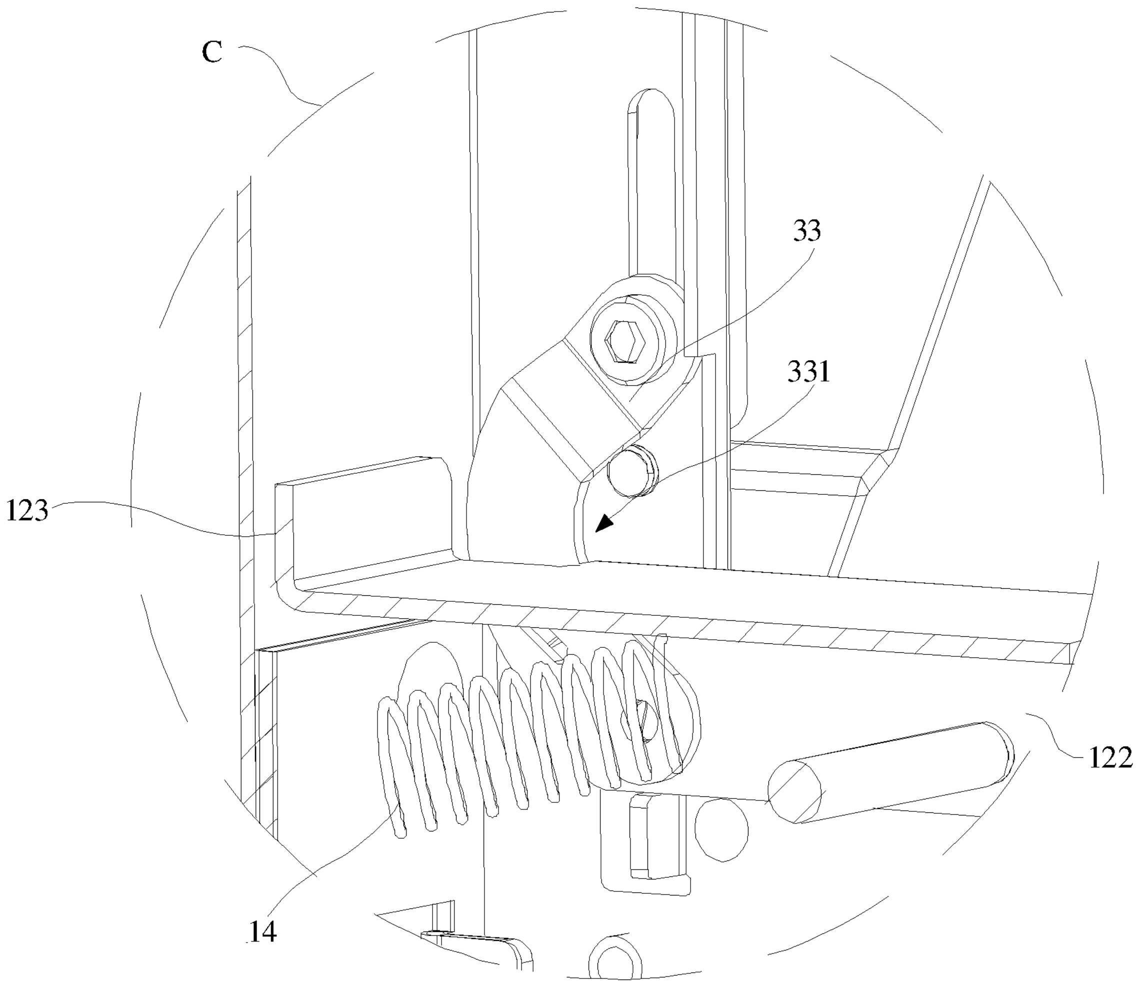
FIG. 7 is an enlarged drawing of a structure at a portion C in FIG. 4.

Referring to FIG. 7, the turnover part 3 further comprises a second connecting piece 33. The second connecting piece 33 is rotatably connected with the placing plate 12 and the sliding piece 31 respectively. The second connecting piece 33 is formed with a limiting groove 331, and at least part of the placing plate 12 is located in the limiting groove 331 and is in limiting fit with the second connecting piece 33. When the sliding piece 31 slides in the direction away from the placing plate 12, the sliding piece 31 drives the second connecting piece 33 to move, and the second connecting piece 33 drives the placing plate 12 to rotate through the limiting groove 331.

During actual application, when the extruding piece 21 drives the sliding piece 31 to slide upwards along the height direction Z, the sliding piece 31 drives the second connecting piece 33 to move upwards. Because two ends of the second connecting piece 33 are rotatably connected with the sliding piece 31 and the placing plate 12 respectively, and the placing plate 12 is in limiting fit with the limiting groove 331, the second connecting piece 33 moves upwards and abuts against the placing plate 12, driving the free end 122 of the placing plate 12 to turn around the horizontal plate 115, so that the pop can falls off from the placing plate 12. Under the condition that a sliding distance of the sliding piece 31 in the height direction Z is limited, by setting the second connecting piece 33, a turnover angle of the placing plate 12 is increased, which is beneficial for the pop can to fall off.

Figure 8:
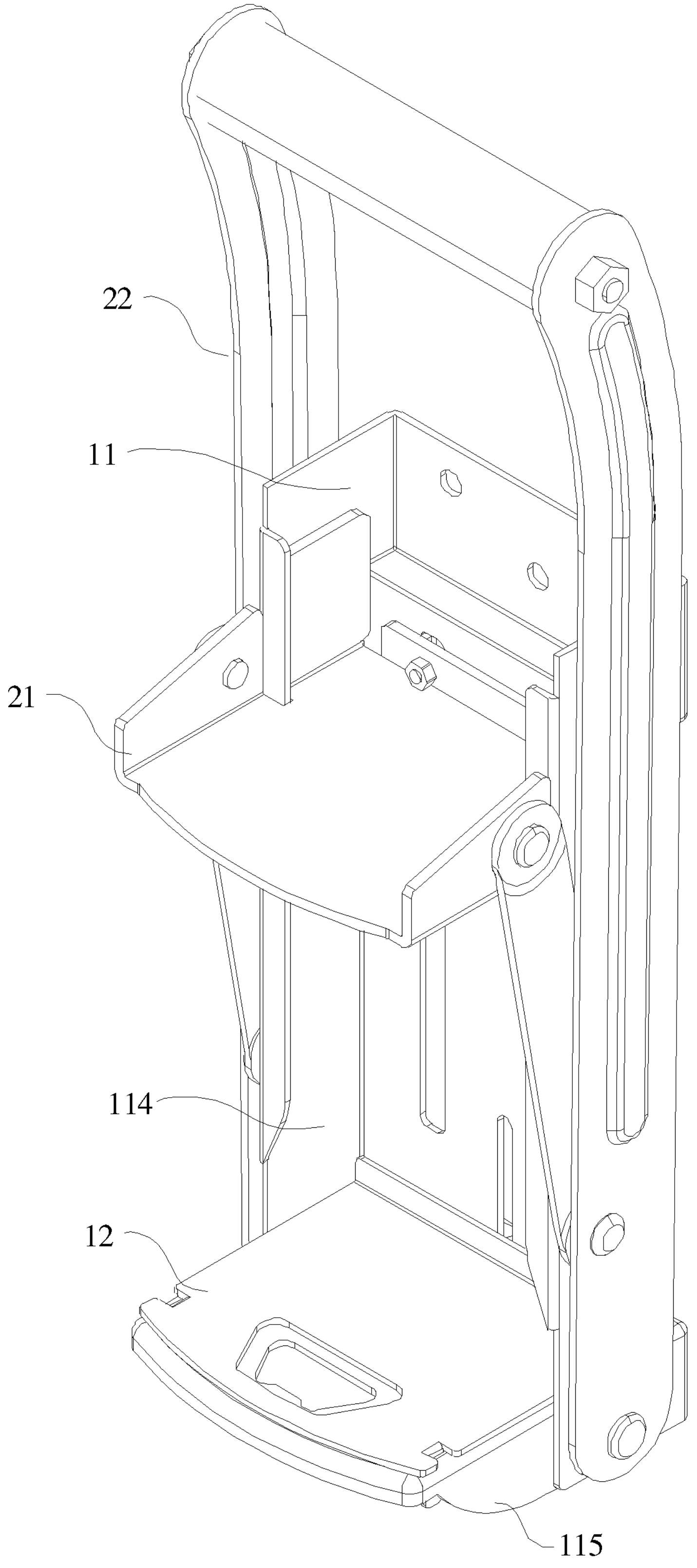
FIG. 8 is another schematic structural diagram of the can press in the embodiments of the present application.
Figure 9:
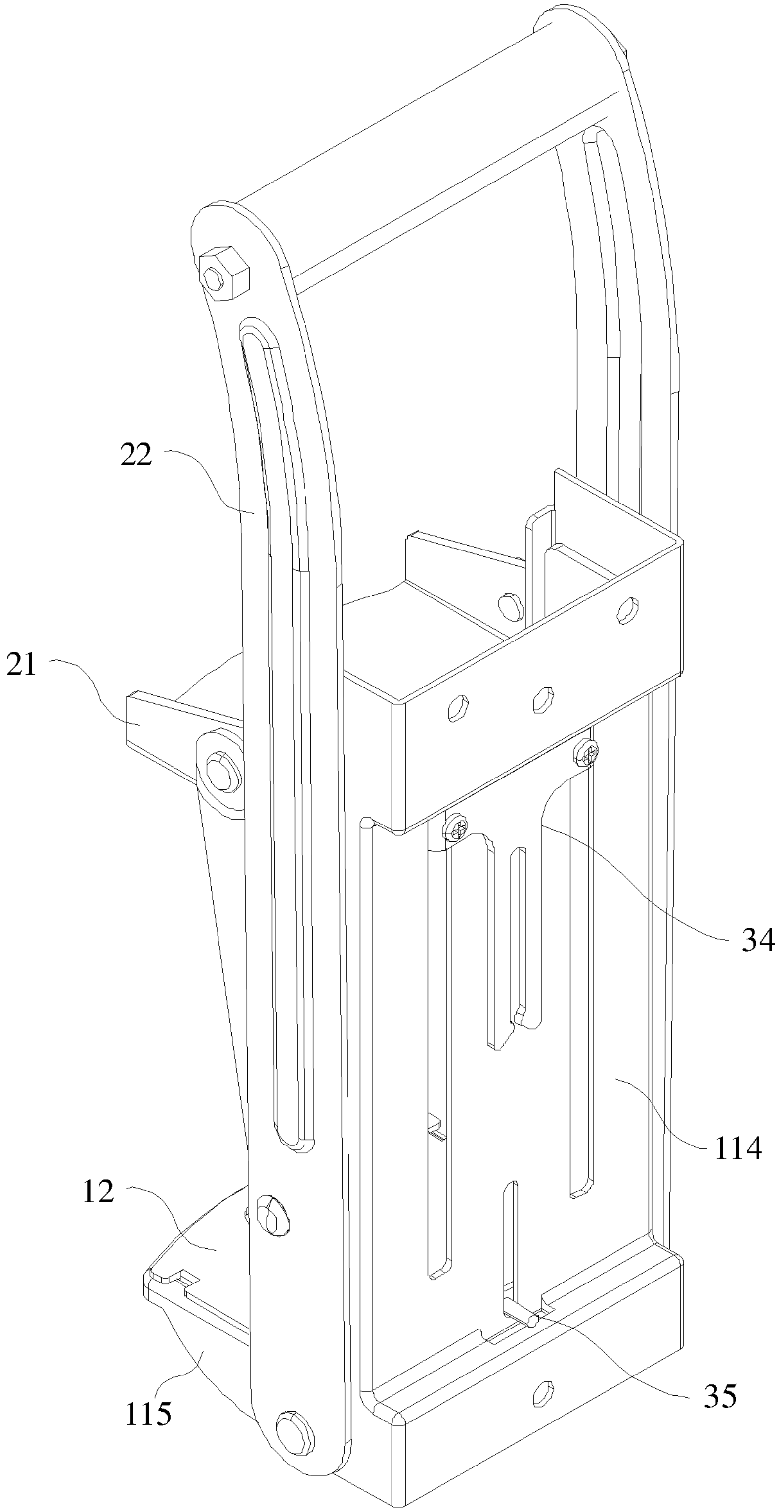
FIG. 9 is another schematic structural diagram of the turnover part in the embodiments of the present application.

As an alternative embodiment, it is different from the above-mentioned embodiment in that: the structure of the turnover part 3 is different. Referring to FIG. 8 and FIG. 9, the turnover part 3 may also comprise a clamping piece 34 and a clamping portion 35. The clamping piece 34 is connected with the extruding piece 21 and is slidably connected with the supporting piece 11. The clamping portion 35 is connected to the placing plate 12 and is slidably connected with the supporting piece 11. The clamping piece 34 is used for clamping with the clamping portion 35.

During actual application, a position of the clamping piece 34 is opposite to that of the clamping portion 35. When the pop can needs to be extruded, the driving piece 22 drives the extruding piece 21 to slide in the direction close to the placing plate 12, and the extruding piece 21 drives the clamping piece 34 to slide in the direction close to the placing plate 12, so that the clamping piece 34 is clamped with the clamping portion 35. After the extrusion is completed, when the driving piece 22 drives the extruding piece 21 to slide in the direction away from the placing plate 12, the clamping piece 34 clamps the clamping portion 35. Therefore, the clamping piece 34 drives the clamping portion 35 to move. Because the clamping portion 35 is connected to the placing plate 12, the clamping piece 34 drives the placing plate 12 to turn over around the horizontal plate 115 in this manner, so that the pop can falls off.

Figure 10:
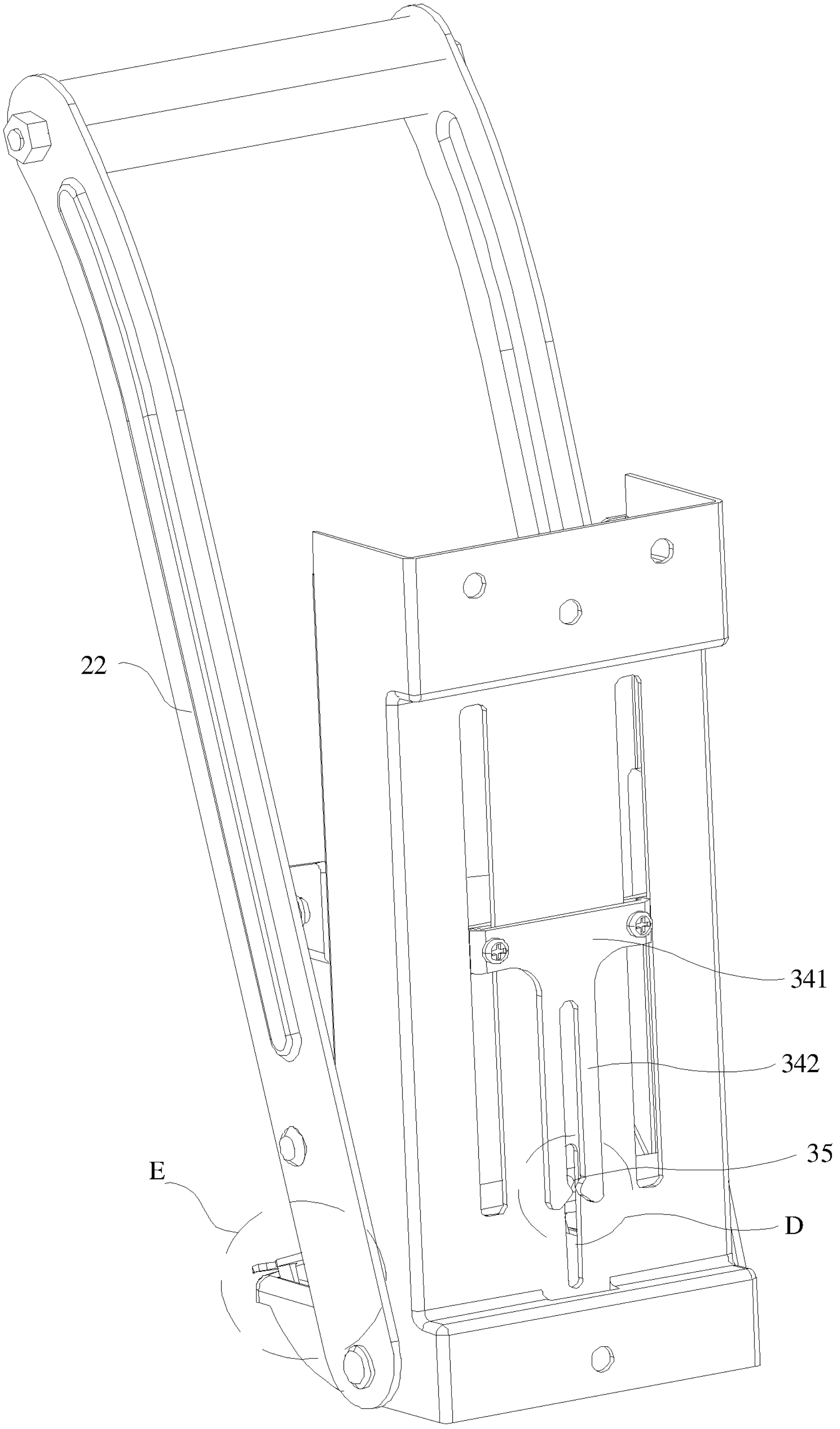
FIG. 10 is a schematic diagram showing another working state of the can press in the embodiments of the present application.
Figure 11:
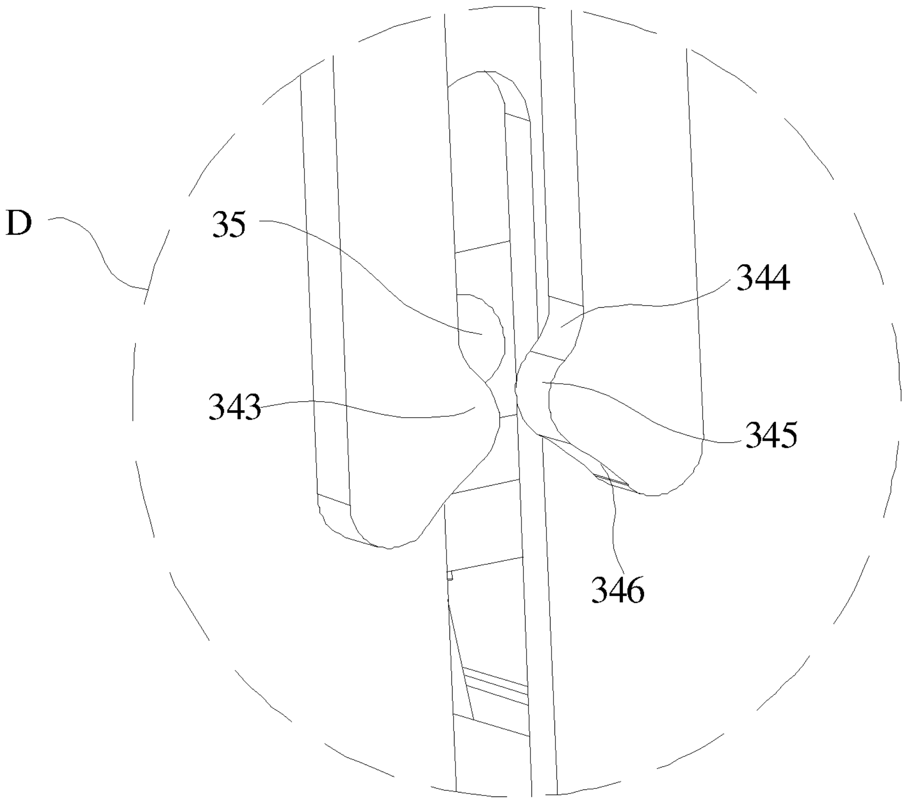
FIG. 11 is an enlarged drawing of a structure at a portion D in FIG. 10.

Referring to FIG. 10 and FIG. 11, the clamping piece 34 comprises a body portion 341 and two clamping arms 342 symmetrically connected to the body portion 341. The body portion 341 is connected with the extruding piece 21, and the two clamping arms 342 protrude in a direction close to each other to form a convex portion 343. The convex portion 343 is provided with a first inclined plane 344, an arc surface 345 and a second inclined plane 346. The first inclined plane 344, the arc surface 345 and the second inclined plane 346 are connected smoothly in turn, and the convex portion 343 is used for clamping with the clamping portion 35.

Specifically, the two clamping arms 342 protrude in the direction close to each other to form the convex portion 343, and the two opposite convex portions 343 form a limiting space for limiting the clamping portion 35 from falling out and preventing the clamping portion 35 from being separated from the clamping piece 34. Meanwhile, the convex portion 343 is provided with the first inclined plane 344, the arc surface 345 and the second inclined plane 346 which are smoothly and transiently connected, and the second inclined plane 346 inclines from bottom to top in the direction close to the arc surface 345. In this manner, when the clamping piece 34 moves downwards and contacts with the clamping portion 35, the second inclined plane 346 is beneficial for the clamping portion 35 to be clamped into the clamping piece 34, and reduces a frictional force between the clamping piece 34 and the clamping portion 35. The first inclined plane 344 inclines from top to bottom in the direction close to the arc surface 345. After the placing plate 12 is turned over, the separation of the clamping portion 35 from the clamping piece 34 is facilitated by a guiding function of the first inclined plane 344.

In order to separate the clamping portion 35 from the clamping part 34, the supporting piece 11 is provided with a sliding chute with a certain length, and the clamping part 35 is slidably connected with the sliding chute. The clamping piece 34 drives the clamping portion 35 to slide against a wall of the sliding chute, so that the clamping portion 35 is separated from the clamping piece 34 through an abutting action of the wall of the sliding chute, and the separated clamping portion 35 is reset with the placing plate 12 under an elastic force of the first elastic piece 14.

Figure 12:
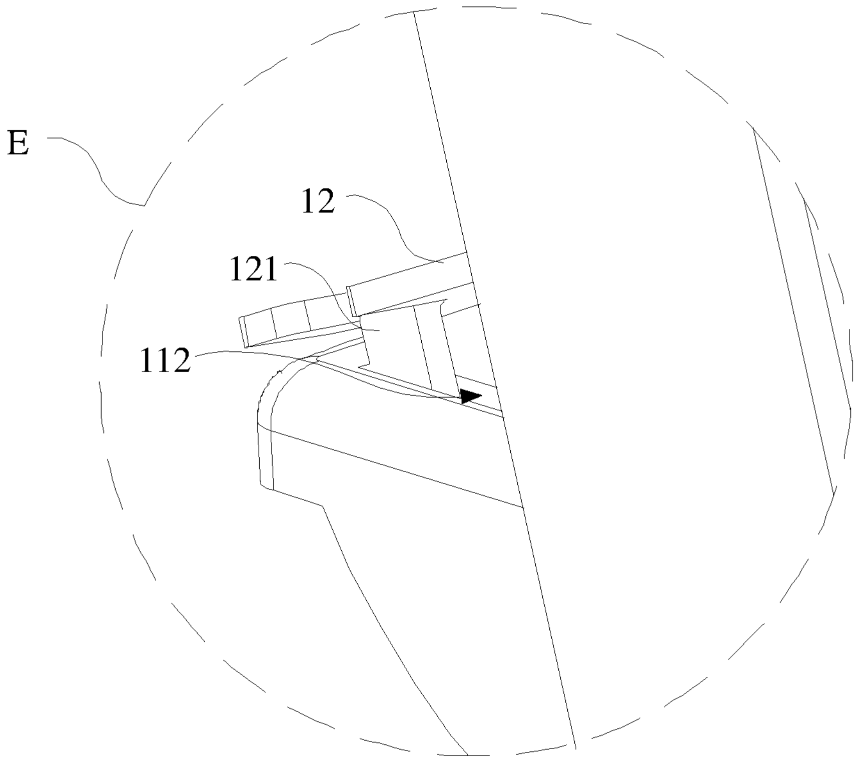
FIG. 12 is an enlarged drawing of a structure at a portion E in FIG. 10.

Referring to FIG. 12, in one embodiment, one end of the placing plate 12 is provided with an inserting portion 121, and the horizontal plate 115 is provided with an insertion groove 112. One end of the placing plate 12 is inserted into the insertion groove 112, and the other end of the placing plate is overlapped on the horizontal plate 115. When the clamping piece 34 drives the clamping portion 35 to slide upwards, the clamping portion 35 drives the placing plate 12 to turn over around the horizontal plate 115 until the placing plate 12 turns over to that the inserting portion 121 abuts against a groove wall of the insertion groove 112. Due to a limiting effect of the inserting portion 121 and the insertion groove 112, the placing plate 12 cannot continue to rotate. In this case, the clamping portion 35 cannot continue to slide upwards, so that the clamping piece 34 can be separated from the clamping portion 35. By inserting one end of the placing plate 12 into the horizontal plate 115 and overlapping the other end of the placing plate with the horizontal plate 155, it is beneficial for the placing plate 12 to be reset under the elastic force of the first elastic piece 14.

Different from the prior art, the present application provides a can press which comprises a supporting part 1 and a power part 2. The supporting part 1 comprises a placing plate 12 and a supporting piece 11. The placing plate 12 is movably connected with the supporting piece 11 and is used for placing the pop can. The power part 2 comprises an extruding piece 21 and a driving piece 22, the extruding piece 21 is slidably connected to the supporting piece 11, and the driving piece 22 is rotatably connected with the extruding piece 21 and the supporting piece 11 respectively, wherein the driving piece 22 rotates for driving the extruding piece 21 to slide in a direction close to or away from the placing plate 12, and the extruding piece 21 is used for extruding the pop can. Compared with the prior art, in the present application, the extruding piece 21 is driven to slide by rotating the driving piece 22, so that the extruding piece extrudes the pop can, and the user can realize an extruding function of the extruding piece 21 only by rotating the driving piece 22, which is convenient for the user to apply force, saves physical strength, reduces fatigue of arms of the user, and is convenient to operate.

In the description of the present invention, it should also be noted that the terms "arrangement", "installation", "connected" and "connection" should be understood in a broad sense unless otherwise clearly specified and defined. For example, they may be fixed connection, removable connection or integrated connection; may be mechanical connection or electrical connection; and may be direct connection indirect connection through an intermediate medium, and connection inside two elements. The specific meanings of the above terms in the present invention can be understood in a specific case by those of ordinary skills in the art.

It should be noted that relational terms herein, such as first, second, and the like, are used merely to distinguish one entity or operation from another entity or operation, and do not necessarily require or imply that there is any such relationship or order between these entities or operations. Furthermore, the terms "comprise", "include", or any other variation thereof, are intended to cover a non-exclusive inclusion, so that a process, a method, an article, or equipment that comprises a list of elements not only includes those elements but also includes other elements not expressly listed, or further includes elements inherent to such process, method, article, or equipment. In a case without further limitations, an element defined by the phrase "comprising one . . . " does not preclude the presence of additional identical elements in the process, method, article, or equipment that includes the element.

Although the embodiments of the present invention have been shown and described, it is understood by those of ordinary skills in the art that various changes, modifications, substitutions and variations may be made to these embodiments without departing from the principle and spirit of the present invention, and the scope of the present invention is defined by the appended claims and their equivalents.

What is claimed is:

1. A can press for extruding a pop can, comprising:

a supporting part (1) comprising a placing plate (12) and a supporting piece (11), wherein the placing plate (12) is movably connected with the supporting piece (11), and the placing plate (12) is used for placing the pop can;

a power part (2), comprising an extruding piece (21) and a driving piece (22), herein the extruding piece (21) is slidably connected to the supporting piece (11), and the driving piece (22) is respectively connected with the extruding piece (21) and the supporting piece (11); wherein, the driving piece (22) comprises a rotating piece (221) for driving the extruding piece (21) to slide in a direction close to or away from the placing plate (12), and the extruding piece (21) is used for extruding the pop can; and a turnover part (3) respectively connected with the extruding piece (21) and the placing plate (12); wherein, after the extruding piece (21) performs extrusion, the extruding piece (21) slides in the direction away from the placing plate (12), the extruding piece (21) drives the turnover part (3) to move, and the turnover part (3) drives the placing plate (12) to turn over, so that the pop can falls off from the placing plate (12); and wherein the turnover part (3) comprises a sliding piece (31), the sliding piece (31) is rotatably connected with the placing plate (12), the sliding piece (31) is slidably connected to the supporting piece (11), and the sliding piece (31) and the extruding piece (21) are arranged on two opposite sides of the supporting piece (11) in a lengthwise direction (X) at interval, the supporting piece (11) is provided with a through groove (111), and at least part of the sliding piece (31) is in sliding fit with the through groove (111) and passes through the through groove (111) for abutting against the extruding piece (21).

2. The can press according to claim 1, wherein the driving piece (22) further comprises a first connecting piece (222), the rotating piece (221) is rotatably connected to the supporting piece (11), and the first connecting piece (222) is respectively connected with the rotating piece (221) and the extruding piece (21); wherein, the rotating piece (221) rotates to drive the first connecting piece (222) to move, and the first connecting piece (222) moves to drive the extruding piece (21) to slide, SO that the extruding piece (21) is close to or away from the placing plate (12).

3. The can press according to claim 1, wherein the supporting part (1) further comprises a first elastic piece (14), and one end of the placing plate (12) away from the supporting piece (11) is movably connected with the supporting piece (11); one end of the placing plate (12) close to the supporting piece (11) is overlapped with the supporting piece (11), and the first elastic piece (14) is connected between the placing plate (12) and the supporting piece (11); wherein, when the extruding piece (21) slides in the direction away from the placing plate (12), the extruding piece (21) drives the turnover part (3) to move, the turnover part (3) drives the placing plate (12) to rotate in a direction away from the supporting piece (11), and the first elastic piece (14) drives the placing plate (12) to rotate in a direction close to the supporting piece (11).

4. The can press according to claim 1, wherein, when the extruding piece (21) slides in the direction close to the placing plate (12), the extruding piece (21) presses the sliding piece (31) to move the sliding piece (31) in a direction away from the extruding piece (21); and when the extruding piece (21) slides in the direction away from the placing plate (12), the extruding piece (21) abuts against the sliding piece (31) and drives the sliding piece (31) to slide in the direction away from the extruding piece (21), and the sliding piece (31) slides to drive the placing plate (12) to rotate.

5. A can press for extruding a pop can, comprising:

a supporting part (1) comprising a placing plate (12) and a supporting piece (11), wherein the placing plate (12) is movably connected with the supporting piece (11), and the placing plate (12) is used for placing the pop can;

a power part (2) comprising an extruding piece (21) and a driving piece (22), wherein the extruding piece (21) is slidably connected to the supporting piece (11), and the driving piece (22) is respectively connected with the extruding piece (21) and the supporting piece (11); wherein, the driving piece (22) comprises a rotating piece (221) for driving the extruding piece (21) to slide in a direction close to or away from the placing plate (12), and the extruding piece (21) is used for extruding the pop can; and a turnover part (3) respectively connected with the extruding piece (21) and the placing plate (12); wherein, after the extruding piece (21) performs extrusion, the extruding piece (21) slides in the direction away from the placing plate (12), the extruding piece (21) drives the turnover part (3) to move, and the turnover part (3) drives the placing plate (12) to turn over, so that the pop can falls off from the placing plate (12); wherein the turnover part (3) comprises a clamping piece (34) and a clamping portion (35), the clamping piece (34) is connected with the extruding piece (21) and the clamping piece (34) is slidably connected directly with the supporting piece (11), the clamping portion (35) is connected to the placing plate (12) and the clamping portion (35) is slidably connected with the supporting piece (11), and the clamping piece (34) is used for clamping with the clamping portion (35).

6. The can press according to claim 5, wherein the clamping piece (34) comprises a body portion (341) and two clamping arms (342) symmetrically connected to the body portion (341), the body portion (341) is connected with the extruding piece (21), and the two clamping arms (342) protrude in a direction close to each other to form a convex portion (343), the convex portion (343) is provided with a first inclined plane (344), an arc surface (345) and a second inclined plane (346), the first inclined plane (344), the arc surface (345) and the second inclined plane (346) are connected smoothly in turn, and the convex portion (343) is used for clamping with the clamping portion (35).

7. The can press according to claim 4, wherein the sliding piece (31) bulges in a direction close to the through groove (111) to form an abutting portion (311), and the abutting portion (311) is in sliding fit with the through groove (111) and passes through the through groove (111) for abutting against the extruding piece (21); and along a height direction (Z) of the supporting piece (11), the abutting portion (311) gradually inclines from top to bottom in a direction close to the extruding piece (21).

8. The can press according to claim 4, wherein the supporting part (1) comprises a guide plate (13), one end of the guide plate is connected with the supporting piece (11), and along a height direction (Z) of the supporting piece (11), the guide plate (13) gradually inclines from bottom to top in a direction close to the sliding piece (31); wherein, when the extruding piece (21) drives the sliding piece (31) to move in the direction away from the placing plate (12), the guide plate (13) abuts against the sliding piece (31) to move the sliding piece (31) in the direction away from the extruding piece (21).

9. The can press according to claim 4, wherein the turnover part (3) comprises a second elastic piece (32), the second elastic piece (32) is connected with the supporting piece (11), the sliding piece (31) is arranged between the supporting piece (11) and the second elastic piece (32), and the second elastic piece (32) is used for elastically abutting against the sliding piece (31) to move the sliding piece (31) in a direction close to the through groove (111).

10. The can press according to claim 4, wherein the turnover part (3) further comprises a second connecting piece (33), the second connecting piece (33) is rotatably connected with the placing plate (12) and the sliding piece (31) respectively, the second connecting piece (33) is formed with a limiting groove (331), and at least part of the placing plate (12) is located in the limiting groove (331) and is in limiting fit with the second connecting piece (33);

wherein, when the sliding piece (31) slides in the direction away from the placing plate (12), the sliding piece (31) drives the second connecting piece (33) to move, and the second connecting piece (33) drives the placing plate (12) to rotate through the limiting groove (331).

11. The can press according to claim 5, wherein, when the extruding piece (21) slides in the direction close to the placing plate (12), the extruding piece (21) drives the clamping piece (34) to slide in the direction close to the placing plate (12), SO that the clamping piece (34) is clamped with the clamping portion (35); and when the extruding piece (21) slides in the direction away from the placing plate (12), the clamping piece (34) drives the clamping portion (35) to move, and drives the placing plate (12) to rotate relative to the supporting piece (11).

* * * * *